United States Patent
Rice et al.

(10) Patent No.: US 7,026,557 B2
(45) Date of Patent: Apr. 11, 2006

(54) APPARATUS AND METHOD FOR WEIGHTING OBJECTS ON A FORK LIFT TRUCK

(75) Inventors: Thomas S Rice, Columbus, OH (US); Steven Everett Hamilton, Upper Arlington, OH (US)

(73) Assignee: Mettler-Toledo, Columbus, OH (US)

( * ) Notice: Subject to any disclaimer, the term of this patent is extended or adjusted under 35 U.S.C. 154(b) by 196 days.

(21) Appl. No.: 10/605,848

(22) Filed: Oct. 30, 2003

(65) Prior Publication Data

US 2005/0092530 A1    May 5, 2005

(51) Int. Cl.
*G01G 19/12* (2006.01)

(52) U.S. Cl. .......................... 177/136; 177/200; 701/50; 702/173

(58) Field of Classification Search ........ 177/136–141, 177/199–200; 701/50; 702/101–102, 173–174
See application file for complete search history.

(56) References Cited

U.S. PATENT DOCUMENTS

| | | | | |
|---|---|---|---|---|
| 3,910,363 A | * | 10/1975 | Airesman | 177/139 |
| 5,321,637 A | * | 6/1994 | Anderson et al. | 702/174 |
| 5,666,295 A | * | 9/1997 | Bruns | 702/174 |
| 5,689,092 A | * | 11/1997 | Wurz et al. | 177/145 |
| 5,783,755 A | * | 7/1998 | Bruns | 73/862.541 |
| 5,824,963 A | * | 10/1998 | Bruns et al. | 177/136 |
| 5,929,389 A | * | 7/1999 | Keuper | 177/141 |
| 6,002,090 A | * | 12/1999 | Johnson et al. | 177/136 |
| 6,025,563 A | * | 2/2000 | Lesesky et al. | 177/136 |
| 6,232,566 B1 | * | 5/2001 | Bruns | 177/139 |

* cited by examiner

*Primary Examiner*—Randy W. Gibson
(74) *Attorney, Agent, or Firm*—Jeffrey Furr

(57) ABSTRACT

This invention relates to an improved apparatus for measuring the weight of an object being carried by a fork lift truck. Accurate weight is obtained by combining the measurements of the tension load(s) exerted by the chain(s) used to lift and support the fork carrying carriage with a measurement of the vertical forces imposed on the carriage by the mast through the carriage guides that are used to contain carriage movement within the mast and support the moment created by the object being weighed. The weight thusly determined can be easily calibrated for both pitch and roll mast angles. The apparatus can be integrated into the mast system of the fork truck without significantly affecting the fork truck's load carrying capacity. Specifically, the scale apparatus does not increase the overturning moment created by the weight of the object as compared with that of the standard non-instrumented carriage.

18 Claims, 6 Drawing Sheets

CARRIAGE ELECTRONICS SCHEMATIC

APPARATUS AND METHOD FOR WEIGHTING OBJECTS ON A FORK LIFT TRUCK

BACKGROUND OF INVENTION

1. Field of the Invention

This invention relates to an apparatus for measuring the weight of an object being carried by a fork lift truck.

2. Description of Prior Art

A typical fork truck has a telescopic mast comprising at least two sections of which the bottom section is mounted on the lift truck chassis. One mast section may be positioned relative to another by, for example, one or more hydraulic cylinders so as to vary the height of the mast between minimum and maximum limits. A vertically movable carriage is provided with rollers, or other guide means for engaging channels formed in the mast sections so as to contain carriage movement within the mast and support the moment created by the object being carried. The carriage is typically supported by two chains which pass over pulleys mounted near the top of the mast and are secured at one end to the carriage and at the other end to an anchorage point which is fixed to the bottom section of the mast. A fork or other means is mounted on the carriage and is used to engage the object for lifting and carrying.

Several methods are currently used for determining the weight of an object being carried by a fork lift truck. One method involves measuring the fluid pressure in the hydraulic rams or rams when the fork lift truck is supporting the load. The rams or rams must sustain the weight of the moveable mast section or sections, the carriage and the fork in addition to the weight of the load. The accuracy with which the weight of the object determined by this arrangement is limited because the measured fluid pressure is affected by the frictional forces present between the mast sections, as well as between the carriage and the mast. In addition, the proportion of the measured fluid pressure that is attributable to the object being weighed is in general small compared with the total fluid pressure. This requires a pressure transducer means with both a large pressure range and fine precision.

Another known arrangement involves measuring the tension in the chains(s) supporting the carriage. This is accomplished either by measuring the chain tension(s) directly, or more commonly by measuring the resulting compressive forces exerted between the supporting chain(s) and their anchorage point(s) on the mast. This method is capable of a greater accuracy than the first because the measurement is not dependent upon the weight of the mast sections or on the frictional forces between them. However, the measurement is affected by the frictional forces between the carriage and the mast which provides for a significant source of error. One scheme has been disclosed that improves the chain tension measurement by selecting a specific certain pulley diameter according the chain pitch, and another has been disclosed that utilizes an integrative technique while the carriage is being raised or lowered. In either case the weight determination according to this method is inherently inaccurate due to the frictional forces present between carriage and mast.

A more common method, but one that provides greater accuracy (typically <=0.10% of applied load) involves using four specially constructed dual circuit load cells. In this arrangement a dead frame is provided that affixes to the existing fork truck carriage. The load cells are attached to the dead frame and a new live frame, which has identical fork carrying features as the standard carriage, is attached to the load cells. All load forces and moments therefore pass through the load cell elements positioned between the live frame and the dead frame. The primary load cell outputs are then summed to generate a signal that is directly representative of the weight of the object being weighed.

Further, the load cells are equipped with a secondary sensing circuit that is sensitive to the load moment of the object being weighed and the resulting measurement is used to correct the primary weight signal making the scale substantially insensitive to the load movement. While this arrangement can be added on to an existing fork lift truck, because the device inherently moves the load carrying position forward from the original position, it has the distinct disadvantage of reducing the carrying capacity of the truck. In addition, because of their complexity the load cell sensors utilized in this method are less reliable and more expensive than single circuit load cell designs.

Another common method also provides a dead frame that affixes to the existing fork truck carriage and a new live frame, which as above has identical fork carrying features as the standard carriage, and is positioned somewhat forward of the of the dead frame. The live frame is mechanically connected to the dead frame by a series of flexural elements. These elements allow only vertical motion between the live frame and the dead frame, restricting all other degrees of freedom. The motion between the live frame and the dead frame is then restricted by one or more load cell sensors positioned between the two frames. The force that is measured is then directly representative of the object being weighed. In order to make the weight substantially independent of its position on the forks, the flexural elements are finely positioned so that the vertical forces in the flexural elements due to the load moment are effectively cancelled by one another.

In order to assure accuracy in this arrangement, the flexural elements must be designed so that they are significantly weak in the vertical direction. This allows for their effect on the weight measurement to be accounted for in the calibration but creates the inherent disadvantage of this method; the flexural elements must be substantial enough to carry the loads generated by the moment created by the object being weighed and yet have an insignificant effect in the vertical direction. Again, because this device moves the load position forward on the truck compared with the original load carrying position, the fork trucks carrying capacity is diminished when this apparatus is installed.

PRIOR ART

U.S. Pat. No. 4,421,186 discloses were the weight of items carried by a fork lift truck may be measured by this fork lift scale. This fork lift scale consists of horizontally disposed load sensors connecting a crossbar frame to the crossbars of the fork lift truck. U.S. Pat. No. 5,922,998 discloses a scale built in to the forklift itself.

U.S. Pat. No. 3,196,966 discloses load measuring devices on a fork lift truck which has spaced front and back plates with the front plate carrying the forks and the back plates secured to a mounting plate or mounting straps on a truck. U.S. Pat. No. 4,420,053 discloses a weighing apparatus for fork lifts comprising a weight bridge supported at each end by load cells, the weight bridge and load cells are built into the fork. U.S. Pat. Nos. 5,824,963 and 5,783,755 disclose a lifting device that has a carriage supported by a chain which passes over a sprocket-wheel disposed to rotate about an axis and features a sensing device which allows detecting forces on the chain for a predetermined duration so that the weight of a load supported by the carriage may be determined by calculating an average weight during the duration. These devices do not accurately weigh the load by only measure one type of force, the drag force.

These scales does not eliminate pitch and roll errors and do not provide accurate enough readings without tremendous expense. There is still room for improvement within the art.

SUMMARY OF INVENTION

It is a general object of the present invention to substantially eliminate the problems described above associated with measuring the weight of an object being carried by a fork lift truck. A more particular object is to eliminate potential pitch and roll errors and provide a more accurate weighing device.

This invention is an improved apparatus and process for measuring the weight of an object being carried by a fork lift truck. Accurate weight is obtained by combining the measurements of the tension load(s) exerted by the chain(s) used to lift and support the fork carrying carriage with a measurement of the vertical forces imposed on the carriage by the mast through the carriage guides that are used to contain carriage movement within the mast and support the moment created by the object being weighed. The weight thusly determined can be easily calibrated for both pitch and roll mast angles. The apparatus can be integrated into the mast system of the fork truck without significantly affecting the fork truck's load carrying capacity. Specifically, the scale apparatus does not increase the overturning moment created by the weight of the object as compared with that of the standard non-instrumented carriage. The apparatus uses wireless communication means to transmit the load values.

BRIEF DESCRIPTION OF DRAWINGS

Without restricting the full scope of this invention, the preferred form of this invention is illustrated in the following drawings.

DETAILED DESCRIPTION

Figure 1:
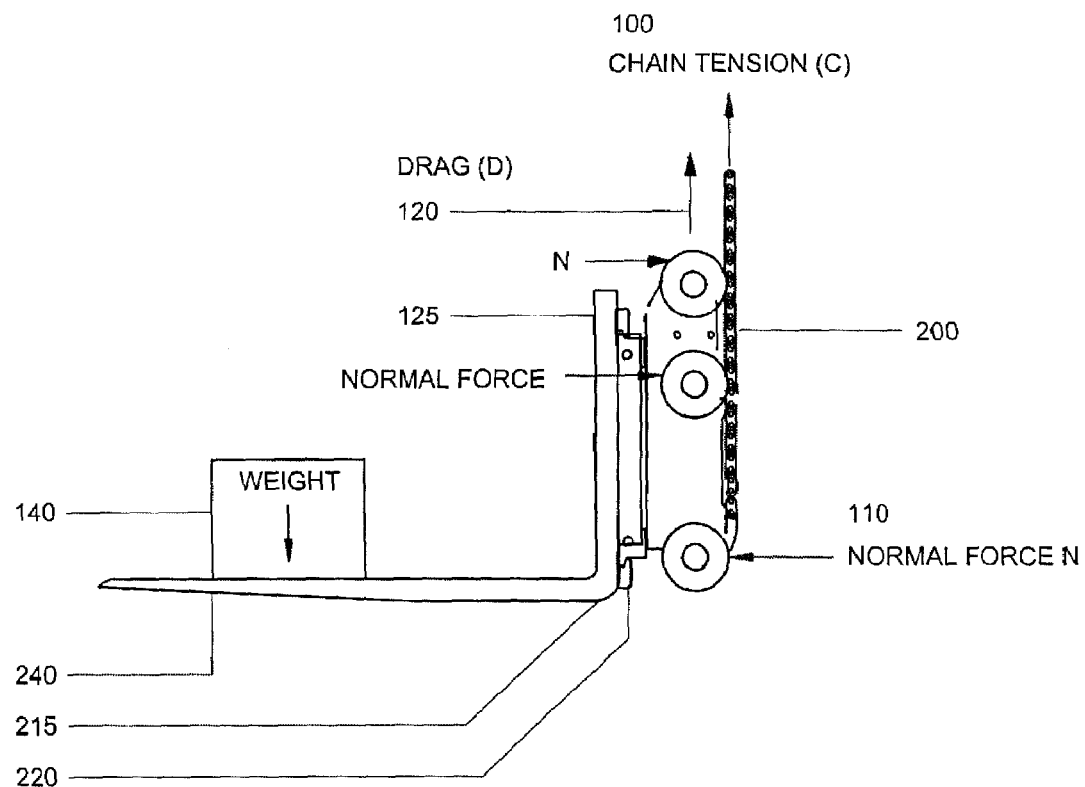
FIG. 1 is a diagram of the forces in play.

The invention addresses problems associated with the prior art in a simple way. The design and implementation of the invention is based on a fundamental understanding of the fork lift truck mechanics. As shown in FIG. 1, a simple static equilibrium leads to the conclusion that the weight (W) 140 of the object is equal to the sum of force in the chain(s) 200 used to lift and support the lifting platform such as a fork 240 carrying carriage 215 (C) 100 and the vertical forces imposed on the carriage 215 by the mast 125 through the carriage guides 220 that are used to contain carriage movement within the mast 125 and support the moment created by the object being weighed (D) 120. D can be a negative force.

$$W=C+D$$

The roller drag 120 may either be upward acting (positive) as shown or downward acting (negative), depending upon, among other things, previous carriage motions.

Another important understanding pertinent to the invention is magnitudes of the forces involved. It can be ascertained experimentally that the roller drag (D) 120 is typically less that 4% of the weight (W) 140. Of course this figure is dependent upon several factors, such as load position on the forks 240, which either increases or decreases the normal forces (N) 110 which directly effect roller drag 120. The roller drag 120 is or course inherently dependent upon the quality of the carriage guides 220 and the fit between the carriage guide system and the mast 125.

The invention uses common tension type load cells, which are well known in the art, to measure the chain force 100. This measurement can easily be accomplished with errors <=0.02% of applied load. By apportioning the anticipated measurement errors according to load proportions it can be found that to achieve total scale error levels <=0.10% of applied load that the measurement of the roller drag 120 needs to be <=2% of applied load. That is;

Total Scale Error=Chain Error*Chain Load+Drag Error*Drag Load 0.09921%=0.02%*(96%)+2%*(4%)

Summarizing, total measurement errors <=0.10% can be obtained by combining an accurate measurement of the chain load 100, which is the predominant force, with a somewhat less accurate measurement of the roller drag 120, which is a less significant contributor to the total weight measurement.

The drag measurement can be accomplished in a number of ways, but because of its simplicity and potential for ruggedness, the invention makes use of flexural elements similar in the way the weight is measured directly in one of the methods outlined above. The flexural elements support the load moment and must be suitably rugged, however in this case because a less precise measurement is required, the design of the flexural elements is not as critical to overall scale performance.

Figure 2:
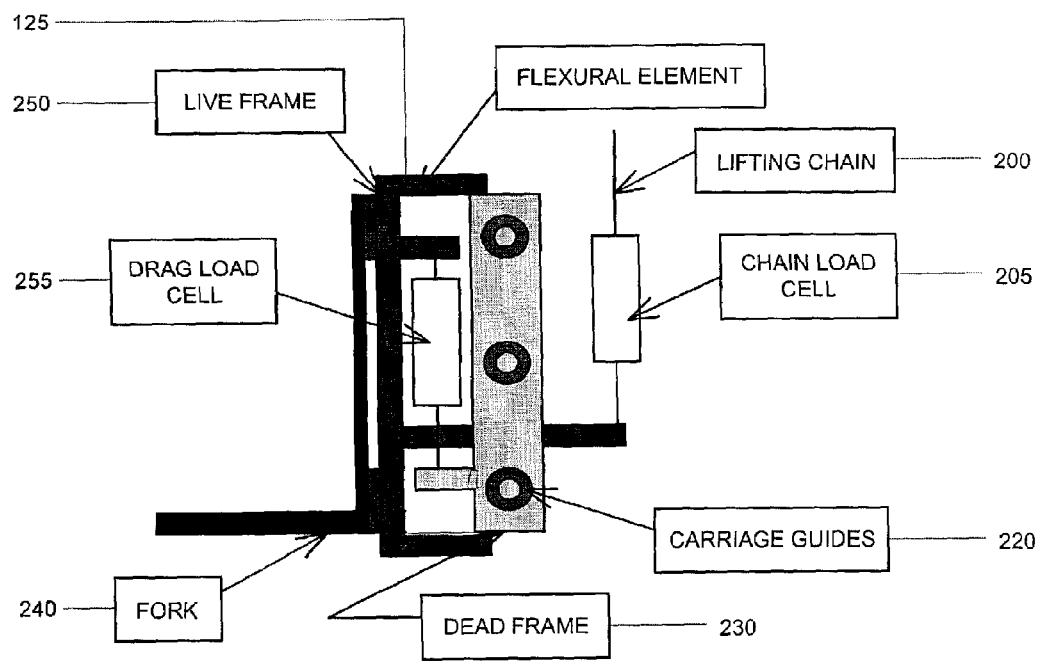
FIG. 2 is a simplified schematic of the weighing apparatus embodying the present invention; F FIG. 3 displays a detailed schematic of the electronic circuitry of the carriage; F FIG. 4 displays a simplified schematic of the electronic circuitry of the carriage.

The arrangement outlined by this invention is schematically illustrated in FIG. 2. The live frame is supported by the lifting chain 200 and includes the fork 240 carrying members. A dead frame 230 is provided that includes the carriage guides 220 that are used to contain its movement within the mast 125. The live frame 250 and the dead frame 230 are connected by flexural elements that restrict all degrees of freedom between the two frames with the exception of in the vertical direction. Common axial (tension/compression) load cells 205 are placed between the two frames that measure substantially the roller drag 120. The chain measurement and the drag measurement can be combined to determine a value proportional to the weight of the object. The weight thusly determined can be easily calibrated for both pitch and roll mast angles.

Figure 4:
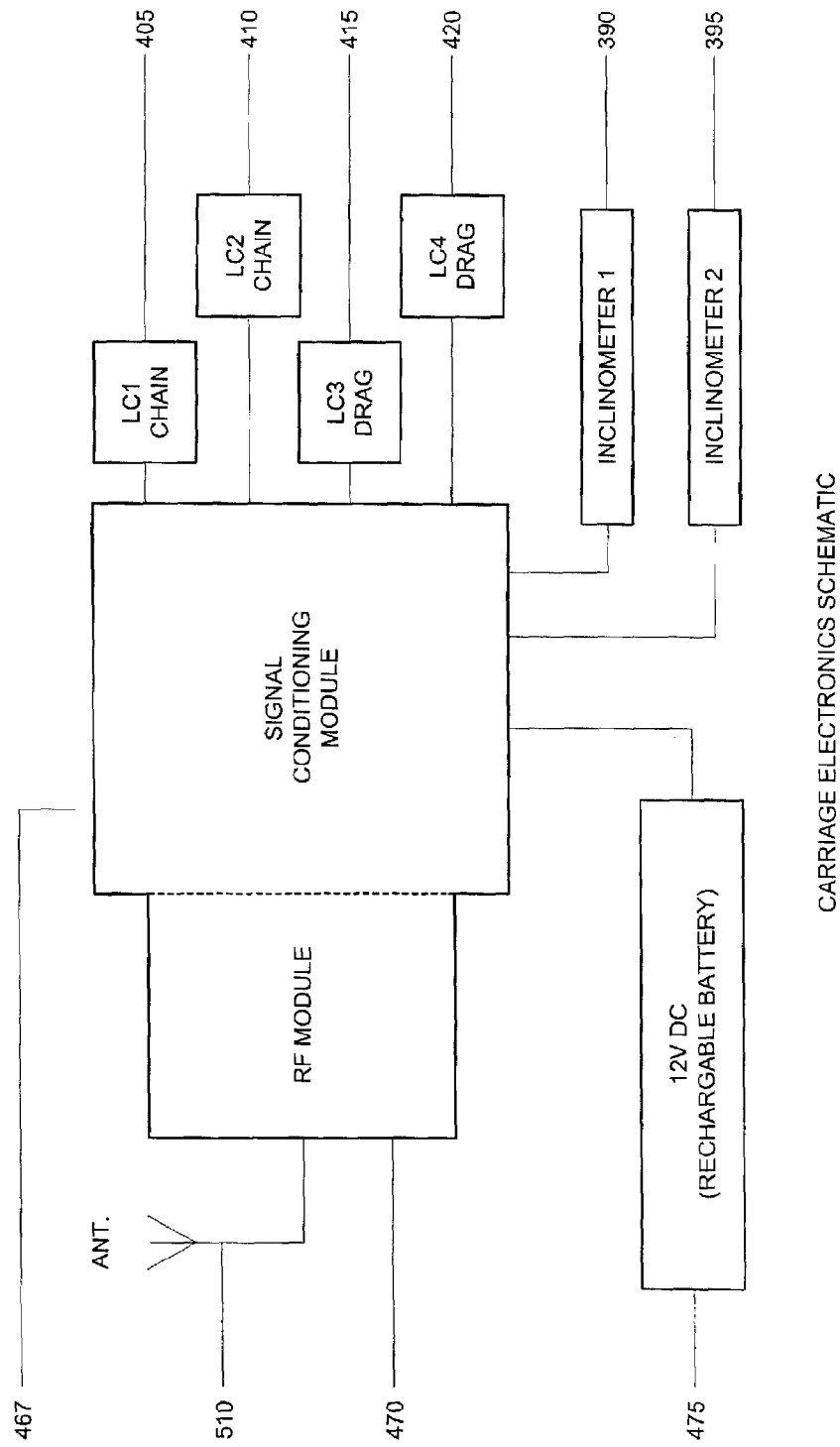

In the preferred embodiment, the scale uses a RF method to supply the measurement data to a weight controller in the cab so that there are no cables running from the carriage to the cab. FIG. 4 gives a simplified box circuit diagram of the current invention. The load cells 405, 410, 415 and 420 and inclinometers 390 and 392 are connected to a signal conditioning module 467. The signal conditioning module monitors each sensor and converts the analog signals they supply to digital data and is powered by a 12 Volt rechargeable battery 475. That data is passed to an RF module 470 for transmission to the weight controller in the cab where the data is processed and weight is determined.

Figure 3:
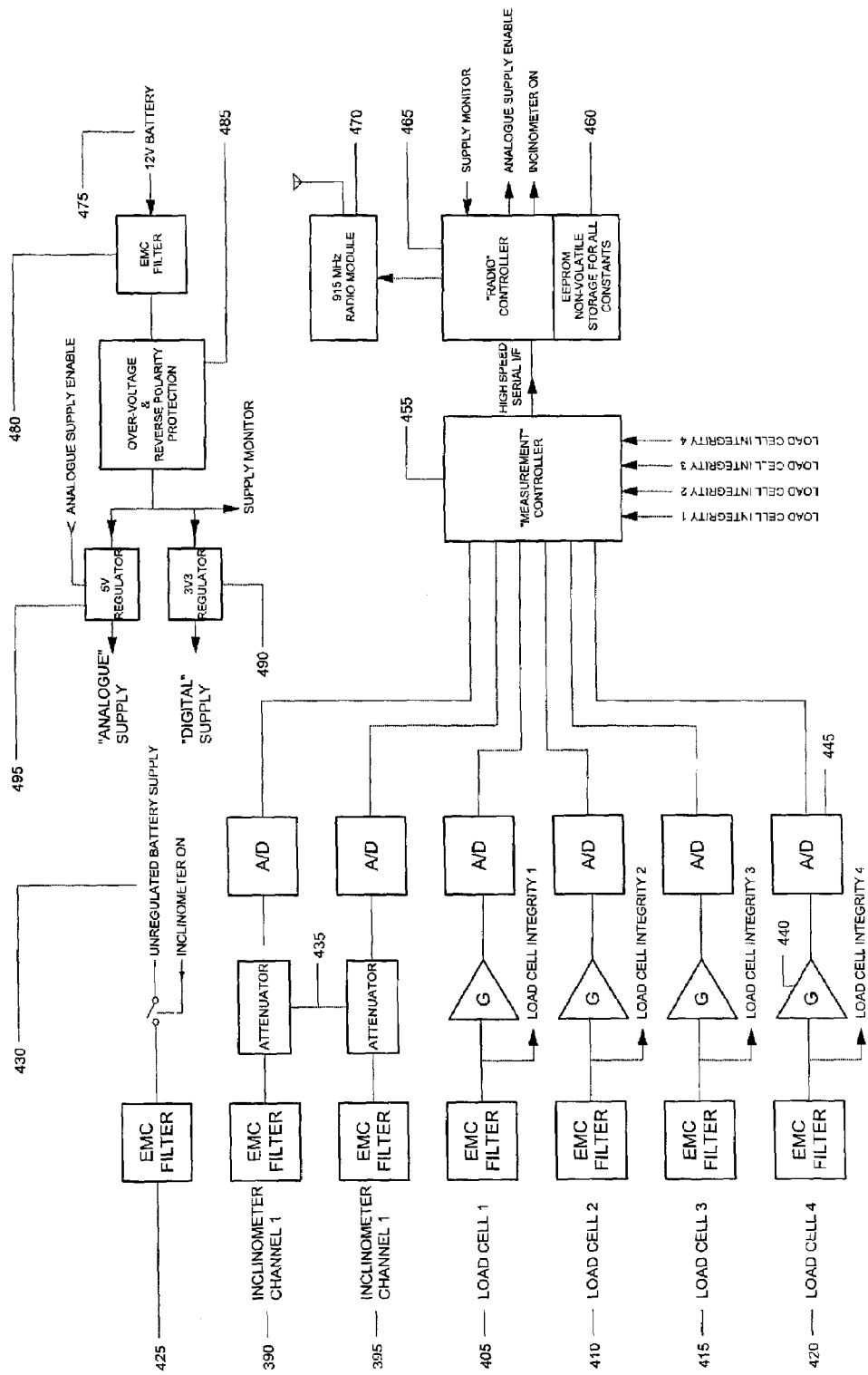

FIG. 3 illustrates in detail the operation associated with the signal conditioning module. The load cells 405, 410, 415 and 420 and inclinometers 390 and 395 are connected to EMC (Electromagnetic Compatibility) filters 425 which reject unwanted high frequency interferences. At this point the load cells can be monitored for integrity and if a fault is present it can be reported to the measurement controller 455 and reported appropriately. After EMC conditioning, the signals are then either amplified (in the case of the load cells) with amplifiers 440 or attenuated (in the case of the inclinometers) with attenuators 435 and provided to A/D converters 445. The outputs of the A/D converters are provided on a 5V serial bus and Voltage Level Converters 450 are used to modify the serial data to the appropriate 3V serial inputs that the Measurement Controller 465 requires.

All digital data is then passed to the measurement controller 455 whose task is to associate the data and prepare it in a format for suitable radio transmission. It also performs certain other signal conditioning tasks such as scaling and filtering. The resulting output is presented to the radio controller 465 which has EEPROM memory 460 for storing additional system constants later used by the scale controller in the weight determination calculation. The radio controller 465 connects to a radio module 470 which sends and receives radio waves.

The system, in the preferred embodiment, is powered by a 12V rechargeable battery 475 connected to an EMC filter 480 which is connected to an over-voltage and reverse polarity protector 485. This is connected to the radio controller 465 and a 5V regulator 465 for analogue and a 3V regulator 490 for a digital supply.

Figure 5:
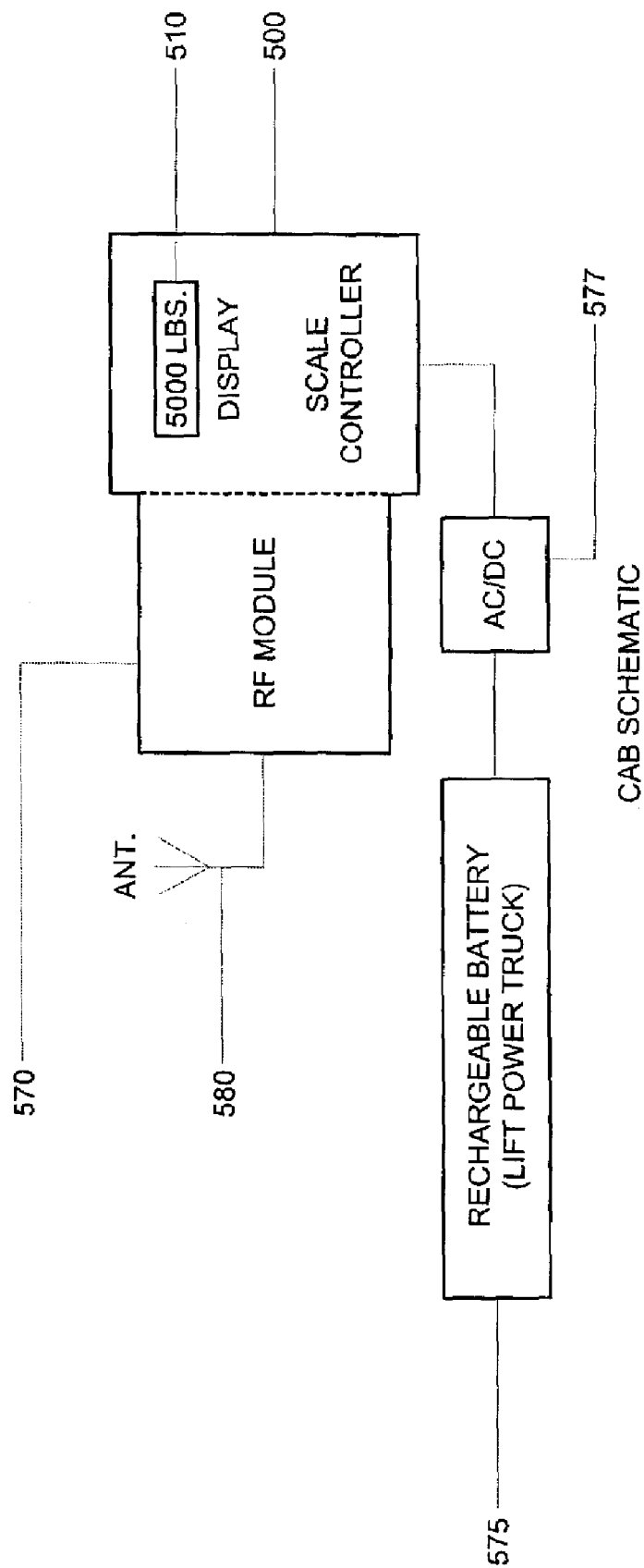
FIG. 5 displays a simplified schematic of the electronic circuitry of the cab.

FIG. 5 gives an overview of the cab electronic schematic. A rechargeable battery 575 that commonly provides power for the fork lift truck is used to provide power to the scale controller 500 thre an AC/DC adapter 577. The scale controller 500 has a display 510 to display the results of the scale 1. The scale controller 500 is connected to a RF module 570. The RF module 570 sends and receives RF signals through the cab antenna 580. The cab antenna 580 sends and receives information from the carriage antenna 510.

The scale controller receives the output of the drag load cells 415,420 and the chain load cells 405,410 and the inclinometers 390,395 and uses those inputs to calculate the weight from the chain weight 100 and the roller drag 120 as detailed above. This weight 140 is displayed by the scale controller 500 on a Display unit 510.

Figure 6:
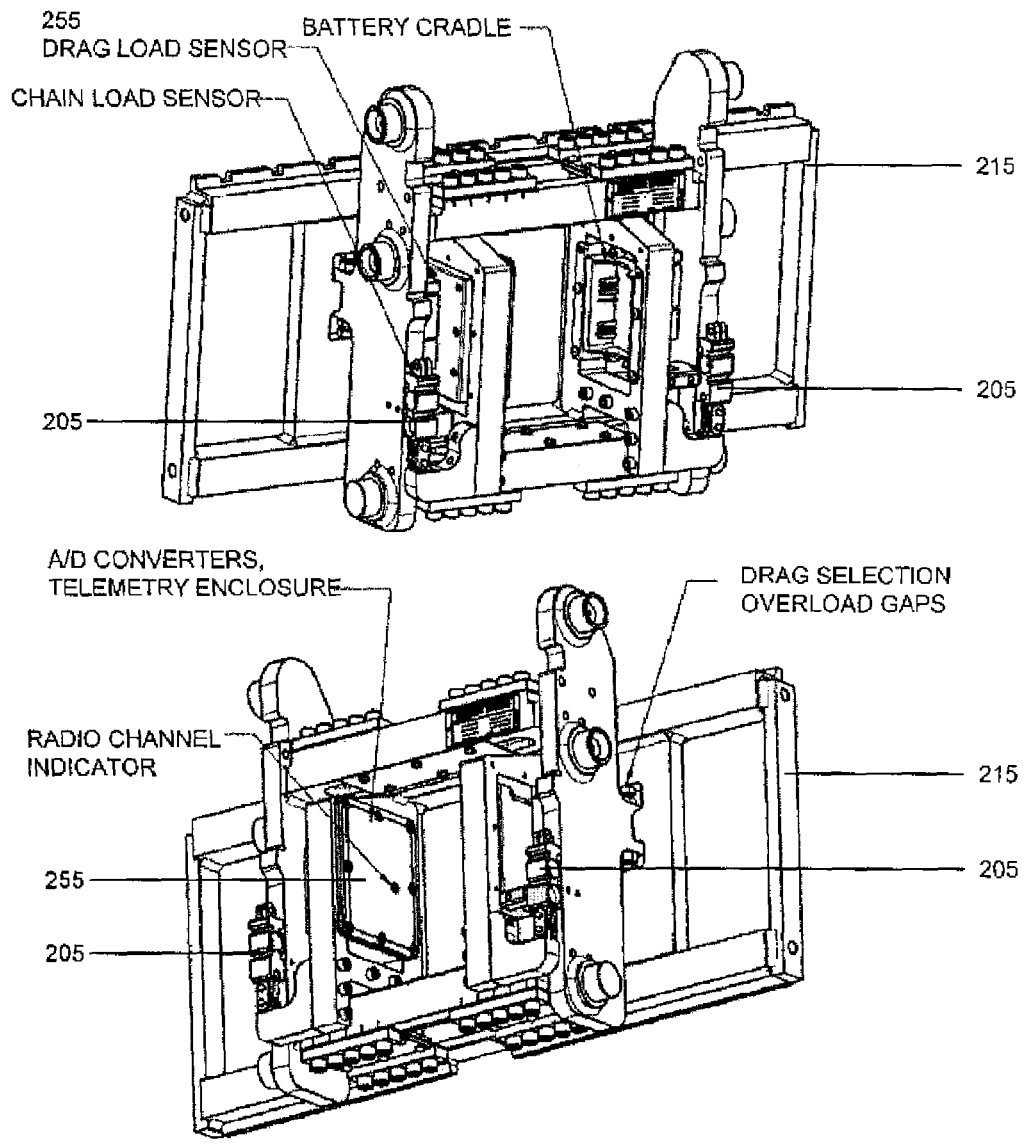
FIG. 6 displays the complete carriage assembly (rollers removed) before mounting in a mast.

FIG. 6 displays the complete carriage assembly (rollers removed) before mounting in a mast. Drag load cell 255 and chain load cell 205 on the carriage 215 are highlighted.

Overload Protection Method

Overload protection is an important feature in any weigh scale, but particularly so for a fork lift scale. Overloads may occur either statically or dynamically, created by an impulse situation. Static overloads are much less of an issue than in a permanently mounted weigh scale due to the natural protection provided by the fork lift truck counterweight. Specifically, when the scale is overloaded, the fork lift truck is overloaded as well and the truck would tend to tip. The operator is then alarmed and this situation is usually prevented.

In the fork lift scale application impulse overloads are commonly encountered and need to be considered carefully for reliable scale operation. As with a permanently mounted weigh scale, impulse loadings can occur when an object is dropped onto the scale, the forks in this case. Additionally, impulse overloads can occur when lifting an object rapidly, or more commonly, when lowering an object rapidly to the floor.

According to the disclosed method for measuring the weight 140 of an object being carried by a fork lift truck by combining the measurements of the tension load(s) exerted by the chain(s) 200 used to lift and support the fork 240 carrying carriage 215 with a measurement of the vertical forces imposed on the carriage 215 by the mast 125 through the carriage guides 220 that are used to contain carriage 215 movement within the mast 125 and support the moment created by the object being weighed, the weight 140 is then expressed as:

$$W=C+D.$$

Also it has been determined that typically the Chain Force C 100 is predominant compared with the Drag Force D 120 and thus for most accurate weighing, the weighing capacity of the Chain Force sensors is best chosen as approximately five to ten times heavier than the weighing capacity of the Drag Force sensors 205. In an impulse situation, the inertia of the dead frame causes the initial reaction force to be absorbed by the Drag Force sensors 205. Following the impulse the proportion of forces returns to the more typical relationship of D<4% W. Practically then the Drag Force sensors 205 are most susceptible to impulse overload and the Chain Force sensors can be assumed (with a proper choice of weighing capacity) to be immune to these effects (as are the lifting chains themselves).

A convenient method to protect the Drag Force sensors 205 is to shunt the impulse overload to the Chain Force sensors for that short period of time when the drag force is larger than the weighing capacity of the Drag Force sensors 205. This is most simply done with an arrangement that allows the dead frame 230 to contact the live frame when these impulses occur. To facilitate this Drag Force sensors 205 with a low spring constant (force/deflection) are selected allowing the inference to occur at a relatively low force as compared with the Drag Force sensor 205 capacity. Adjustable bumper bolts are provided for this purpose and are positioned to assure the frames contact at an appropriate Drag Force 120 thereby diverting the impulse load to the Chain Force sensors thusly protecting the Drag Force 120 sensors. Further, since the Drag Force 120 is bidirectional, bumper bolts are provided for impulse overloads in each direction.

Advantages

Further, the above described arrangement may be positioned in place of a non-weighing carriage and can be integrated into the mast system of the fork truck without significantly affecting the fork truck's load carrying capacity. Specifically, the scale apparatus does not increase the overturning moment created by the weight of the object as compared with that of the standard non-instrumented carriage.

The current invention allows the elimination of pitch and roll errors that are a problem in current methods as well as providing for more accurate results.

Conclusion, Ramifications, and Scope

Although the present invention has been described in considerable detail with reference to certain preferred versions thereof, other versions are possible. Therefore, the point and scope of the appended claims should not be limited to the description of the preferred versions contained herein.

What is claimed is:

1. A weighing apparatus comprising: a plurality of load cells used to measure drag force of a lifting platform; a plurality of loads cell used to measure chain force of a lifting platform; and combining the output of said load cells to determine weight where said load cells used to measure chain force are connected between said lifting chain and said lifting platform and said load cells used to measure drag force are coupled to said lifting platform.

2. A weighing apparatus according to claim 1 wherein a processing unit is used to combine said output.

3. A weighing apparatus according to claim 1 wherein the device is used in a fork lift.

4. A weighing apparatus according to claim 1 wherein said load cells that are used to measure drag.

5. A weighing apparatus according to claim 1 wherein said loads cell that are used to measure drag between a live frame of said lifting platform and a dead frame of said lifting platform.

6. A weighing apparatus according to claim 1 wherein said load cells are connected to a processing unit through the use of connecting means.

7. A weighing apparatus according to claim 1 wherein said load cells are connected to a processing unit through the use of an RF connecting means.

8. A weighing apparatus according to claim 1 wherein said load cells are connected to a processing unit through the use of an RF connecting means with said load cells connected to an RF transmitter and said processing unit connected to an RF receiver with said RF transmitter transmitting to said RF receiver.

9. A weighing apparatus according to claim 1 which includes an overload protection means.

10. A method to measure weight comprising the step of: using a plurality of load cells used to measure drag force of a lifting platform; using a plurality of loads cell used to measure chain force of a lifting chain; and combining the output of said load cells to determine a weight where said load cells used to measure chain force are attached to said lifting chain and a lifting platform and said load cells used to measure drag force are coupled to said lifting platform.

11. A method according to claim 10 wherein a processing unit is used to combine said output.

12. A method according to claim 10 wherein the method is used in a fork lift.

13. A method according to claim 10 wherein said load cell used to measure drag is attached to a flexural element.

14. A method according to claim 10 wherein said load cell used to measure drag is attached a live frame of said lifting platform and a dead frame of said lifting platform.

15. A method according to claim 10 including the steps of connecting a processing unit through the use of connecting means.

16. A method according to claim 10 including the steps of connecting said load cells to a processing unit through the use of an RF connecting means.

17. A method according to claim 10 including the steps of connecting said load cells to a processing unit through the use of an RF connecting means with said load cells connected to an RF transmitter and said processing unit connected to an RF receiver with said RF transmitter transmitting to said RF receiver.

18. A method according to claim 10 which includes an overload protection means.

* * * * *